United States Patent [19]

Kling

[11] 4,085,808

[45] Apr. 25, 1978

[54] SELF-DRIVING AND SELF-LOCKING DEVICE FOR TRAVERSING CHANNELS AND ELONGATED STRUCTURES

[76] Inventor: Miguel Kling, Seestrasse 38, 8131 Berg, Germany

[21] Appl. No.: 763,671

[22] Filed: Jan. 28, 1977

[30] Foreign Application Priority Data

Feb. 3, 1976 Germany .............................. 2604063

[51] Int. Cl.² .............................................. E21C 7/00
[52] U.S. Cl. ......................................... 175/94; 175/61
[58] Field of Search ......................... 175/61, 73, 76, 94

[56] References Cited

U.S. PATENT DOCUMENTS

| | | | |
|---|---|---|---|
| 1,326,480 | 12/1919 | Dana ...................................... | 175/94 |
| 2,481,009 | 9/1949 | Gill ......................................... | 175/94 |
| 2,756,037 | 7/1956 | Kirkpatrick ............................ | 175/94 |
| 3,326,008 | 6/1967 | Baran et al. ........................... | 175/61 |
| 3,354,969 | 11/1967 | Ebeling ................................. | 175/94 |
| 3,888,319 | 6/1975 | Bounne, Jr et al. ................... | 175/76 |

Primary Examiner—James A. Leppink
Attorney, Agent, or Firm—Stevens, Davis, Miller & Mosher

[57] ABSTRACT

A self-driving and self-locking device for traversing the inner walls of channels enclosed on all sides, or for traversing the outer casing of structures with a substantially constant cross-section over their lengths, and for affixing itself thereon, which includes a frame, propulsive elements disposed on said frame and at least one drive means for said propulsive elements to produce movement in the desired direction of movement of said device, said propulsive elements being distributed about the outer or inner circumference relative to a longitudinal axis coinciding substantially with the direction of forward movement and adjustable with respect to the longitudinal axis in a substantially radial direction relative to said frame to adapt to the contact surfaces in the channel or on the elongated structure.

32 Claims, 27 Drawing Figures

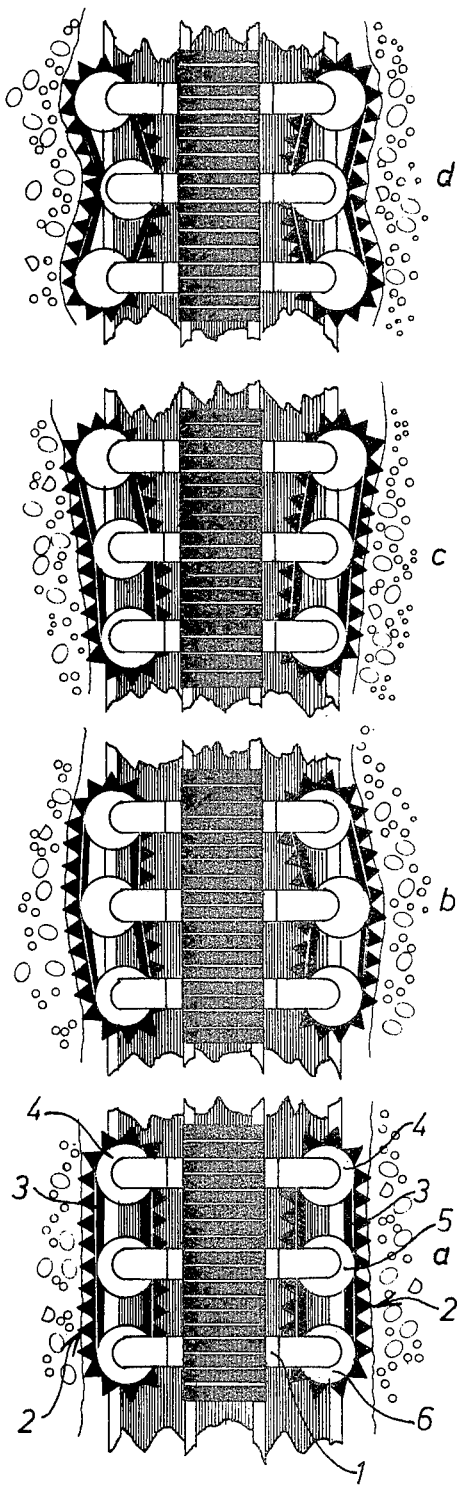
FIG. 1 a-b-c-d
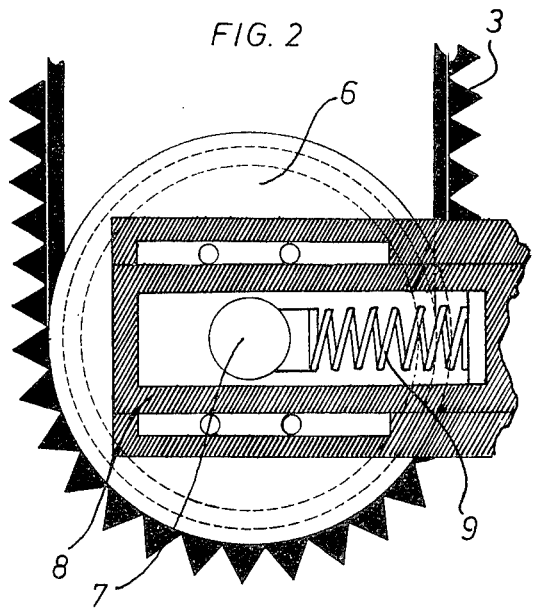
FIG. 2
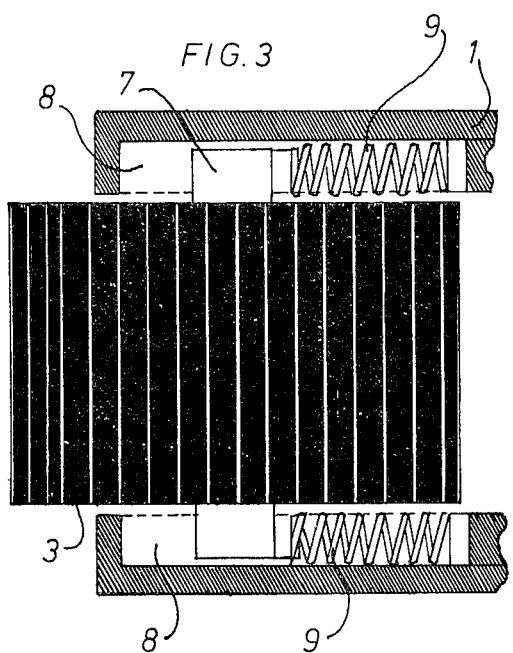
FIG. 3

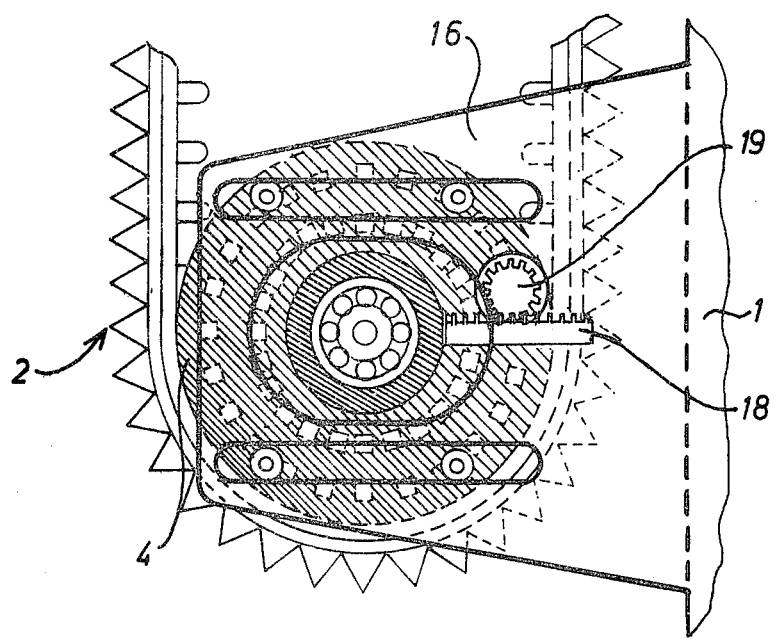
FIG: 5
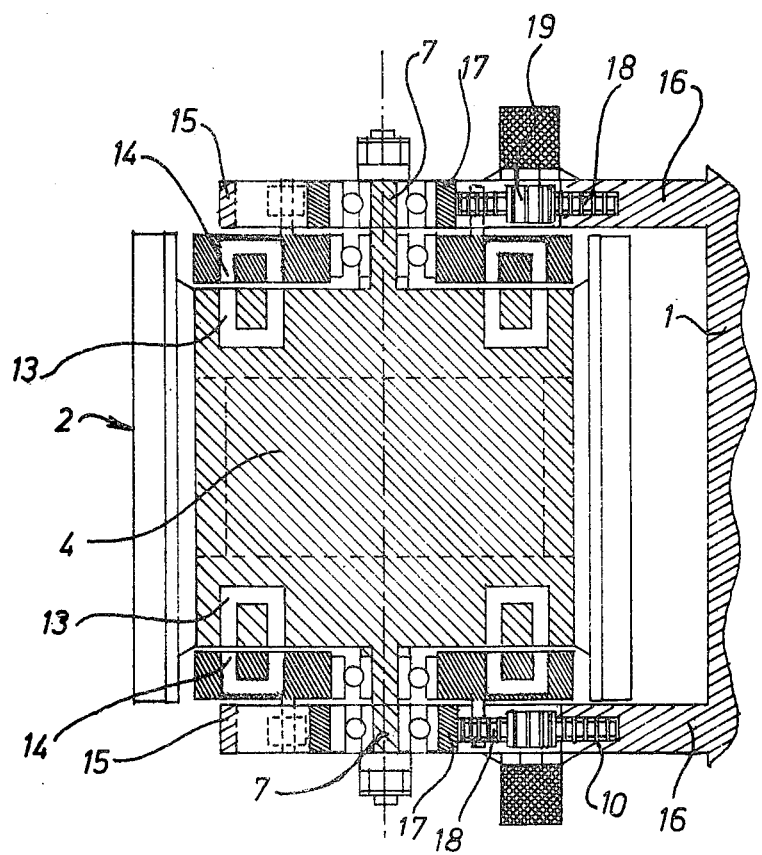
FIG: 6

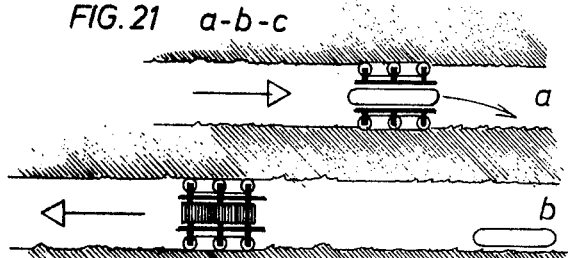
FIG. 21 a-b-c
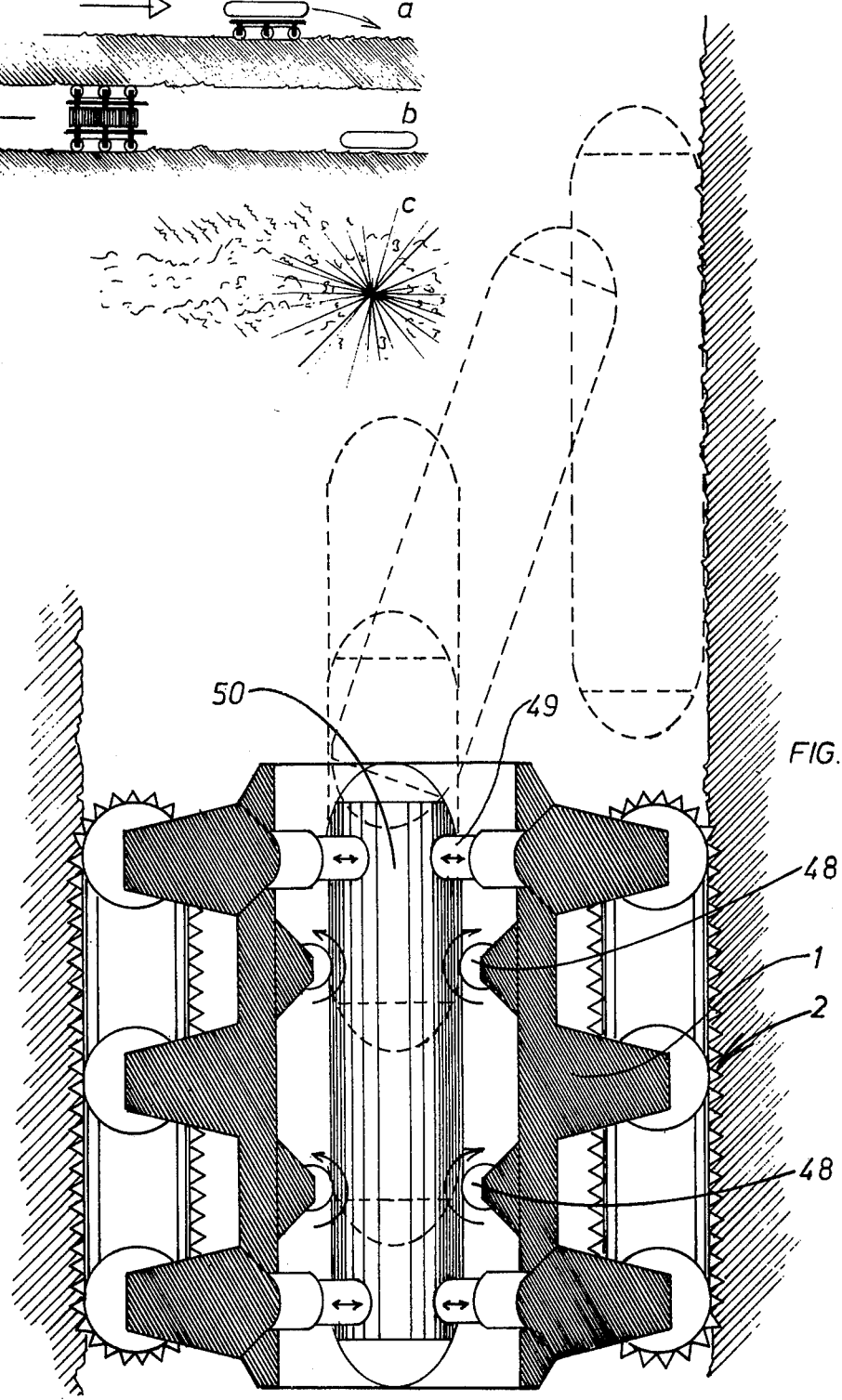
FIG. 20

SELF-DRIVING AND SELF-LOCKING DEVICE FOR TRAVERSING CHANNELS AND ELONGATED STRUCTURES

This invention relates to a self-driving and self-locking device for traversing the inner walls of channels enclosed on all sides, e.g., boreholes, or for traversing the outer casing of structures with a substantially constant cross-section over their lengths, e.g. poles, bars or pipelines, and for affixing itself thereon.

In inaccessible channels, e.g. boreholes or pipelines, the necessity of reaching and inspecting specific locations is frequently a problem due to obstructions. In other cases it is necessary for example to introduce certain objects into narrow channels, for instance explosive charges in boreholes, during the construction of tunnels. In yet other cases, it is necessary to bring processing tools to specific locations in narrow channels. Similar problems arise when elongated structures are laid in inaccessible channels or spaces, e.g. pipelines in sewage systems. It is also necessary in this case to be able to bring inspection equipment or processing tools up to specific locations in the pipelines. In such cases, it was normally necessary up to the present to provide an enlarged access to the channel sites or pipeline locations to be inspected. Processing tools or inspection equipment was then introduced externally through said expanded access to the respective location to be examined. In so doing, the accesses had to have dimensions which were large enough to enable at least one person to reach the location mentioned. This was associated with high costs and expenditure of time.

When drilling boreholes, it was hitherto normally not possible to deviate from a rectilinear borehole path to a great extent, since the drilling tool provided to drill the bore was driven externally by means of a string of pipe which did not permit large curvatures of the course of the borehole due to its inherent stiffness. It was not possible in the past to manipulate drilling tools in the interior of a borehole such that a curved course of the borehole would have been possible.

The object of the invention is to provide a device of the type explained at the outset which has a simple but robust construction to traverse channels enclosed on all sides, even those channels which are inaccessible for persons, or to traverse elongated structures in a carefully regulatable, even remote-controlled, manner, which facilitates reliable fixation at any desired location of the traversed path and which ensures economical and trouble-free operation which requires little servicing and maintenance.

This object is accomplished in accordance with the invention in that the device has a frame on which propulsive elements are disposed which are distributed about the outer or inner circumference relative to a longitudinal axis coinciding substantially with the direction of forward movement, which can be adjusted with respect to the longitudinal axis in a substantially radial direction relative to said frame to adapt to the contact surface in the channel or on the elongated structure, and which can be driven by means of at least one drive means to produce movement in the desired direction of movement.

The device in accordance with the invention can support itself on several sides by means of propulsive elements distributed on the circumference thereof against the inner wall(s) of a closed channel or on the outer periphery of an elongated structure to be traversed and thus assume a defined position at all times. Due to the adjustability of the propulsive elements radially to the axis of forward movement, it is possible to adapt the support to changes in the cross-section of the traversed channel or of the traversed elongated structure and to wall irregularities. Due to the means for driving the propulsive elements, it is possible to impart to the device a movement in the desired direction of advance, i.e. substantially in the longitudinal axis of the traversed channel or the traversed elongated structure. The radial adjustability of the propulsive elements can be utilized for the purpose of locking the device in place at any desired location by pressing the propulsive elements against the contact surfaces with such a force that they are spread apart and fixed in place. In this spread position, the device can serve as a tool carrier to be able to execute working operations in the interior of a channel, e.g. drilling a hole or depositing an explosive charge. The forces of reaction which occur in so doing, e.g. during drilling, are transmitted from the propulsive elements in their spread position to the channel walls. It is not necessary in this case to support the tool externally on a frame located outside the channel or the borehole. The independence of the device from an external rigid course or of a drive means located outside the channel makes it possible to traverse curved channels with the device as well, or to drill the same when the device serves as the carrier of a drilling tool. The device in accordance with the invention can be produced in a robust and space-saving manner due to its simplicity of construction and can therefore be utilized even under difficult conditions, e.g. when drilling boreholes of small diameter in soil.

The device in accordance with the invention can be designed advantageously such that each propulsive element is constructed as a roller-guided endless rotating element similar to a track. Tracks can produce both great pressing forces against the contact surfaces of the channel or elongated structure to be traversed as well as great advancing or driving forces. In addition, irregularities of the wall surfaces to be traversed can be overcome with a low expenditure of force.

Another favorable construction of a device in accordance with the invention is that each propulsive element is designed as a wheel or cylinder.

An advantageous design of the device in accordance with the invention is achieved in that at least one roller of each track or of each wheel or of each cylinder is driven by its own drive means, for instance an electromotor. By individually driving rollers or wheels of the various propulsive elements, it is possible to execute changes of direction with the device in accordance with the invention during travel. For instance, by unilaterally stopping the propulsive elements on one side and by driving the propulsive elements on the other side of a device in accordance with the invention, channels with a curved path can be produced when the device in accordance with the invention serves as the mount for a drilling tool which works the drill or the channel into the soil. Of course, by individually regulating the propulsive elements it is also possible to let the device follow channels with a curved path which already exist.

A favorable structural development which permits a compact structure is that each driven roller or each driven wheel is designed as the rotor of an electromotor. An especially favorable construction is achieved in that each roller or each wheel designed as the rotor of an electromotor supports on its front ends permanent magnetic poles which co-act with poles supplied with current on the stators mounted in the frame.

The device in accordance with the invention is advantageously designed such that each roller or each wheel or each cylinder of each propulsive element is under the influence of a positioning device which radially urges it onto the respective contact surface of the inner channel wall or the outer wall of the elongated structure. This design ensures that each propulsive element is in contact with the wall opposing it during each phase of movement and thus guarantees at all times a defined support of the device in the channel or on the elongated structure.

An advantageous development is achieved in that each positioning device is designed as a compression spring device or another mechanical or electromechanical or pneumatic or hydraulic device. In this construction, each roller or each wheel of the propulsive element is pressed against the respective contact surface by spring pressure or by the pressure of pneumatic or hydraulic or mechanical or electromechanical means. By dimensioning the springs or the pneumatic or hydraulic pressure or the electromechanical force, it is possible to determine the force of the pressure exerted against the contact surface.

A favorable construction is that the positioning device can be locked in place in any desired position. In this way the device in accordance with the invention can be spread at any desired location along the path of movement by pressing the propulsive elements against the contact surfaces and by maintaining the pressure.

A design of the device in accordance with the invention which is especially suitable for traversing channels inaccessible for persons is that the propulsive elements are disposed on the outer circumference of the frame and that the frame is connected with work devices which are to be advanced by means of said device. This design of the device in accordance with the invention thus serves as a carrier device for carrying work devices which are to be introduced into the channel, e.g. drilling devices, television cameras, devices for taking rock samples.

An advantageous further development of the device is that the work device is designed as a drilling device.

One design of the device in accordance with the invention is very favorable for producing boreholes or channels in the ground and is designed such that a drilling device is provided which is disposed on the front end of the frame of the device in the direction of movement. By suitably remote-controlling the device in accordance with the invention, e.g. by selectively stopping the propulsive elements on one side of the device, it is possible to move the device such that not only rectilinear, but also curvilinear boreholes can be produced. It is also possible in this way, for example, to advance channels in an arc under roads or river beds without having to obstruct the road or the river bed for the construction work.

Another favorable development of the device in accordance with the invention is achieved in that drilling devices are arranged on both ends of the frame of the device. By means of such devices in accordance with the invention having this design it is possible, for instance, to clear or free channels in the ground which have become jammed or obstructed in part due to a collapse of the channel walls, in each direction.

An advantageous construction of the device in accordance with the invention is achieved in that the frame includes a device for supporting and for advancing a drilling device in the direction of the borehole channel to which a drilling device can be secured. With this design, the device can be spread and locked in position at a particular location in the channel and the device secured to the frame of the device in accordance with the invention for supporting and for advancing a drilling device can then slide the drilling device forward in the direction of work so that the bore is advanced by a specific increment corresponding to the advance path. The device in accordance with the invention can subsequently be moved forward by an increment, the drilling device simultaneously moved backwards and the device again put into operation after it has again been spread and fixed in place.

A favorable design of the device in accordance with the invention is effected in that the mounting and advancing device is designed either as a hydraulic or pneumatic cylinder-plunger unit or as a toothed rack driven by means of pinions which are mounted in the frame and which are driven via electromotors located in said frame.

Another favorable development of a device in accordance with the invention is given in that the device has a central channel into which guiding and transport elements project, e.g. rollers, which are mounted on said frame and distributed about the channel cross-sectional periphery. In the case of this design, the device in accordance with the invention can be utilized to transport elongated objects, e.g. pipes, bars, hose lines, into a channel or to move them forward in this channel. To this end, the device can be spread and fixed in place, for instance, on the inner walls of the channel at a specific location and then advance the elongated object relative to the channel by means of the guiding and transport elements.

Another favorable design is achieved in that the transport elements can be driven by at least one drive means in a direction of movement which extends in the direction of the longitudinal axis of said device.

For adaptation to different diameters of elongated objects to be transported, it is favorable if the device in accordance with the invention is designed such that the transport elements are mounted on the frame so that they can be adjusted and fixed in position in a radially inwardly manner. In this way the transport elements can be used, for instance, as clamping members which grasp the elongated object to be transported. The object can be moved forward either by moving the devices in accordance with the invention in the channel in its entirety or by moving the transport elements in the direction of transport in the event that the transport elements have a corresponding drive means.

It is also possible, however, to design a device in accordance with the invention from the outset in such a way that only inwardly adjustable and fixable transport elements are mounted on the frame, i.e. that support of the device in an outward direction is impossible. Such a device is then designed and suitable exclusively to traverse elongated objects such as bars, poles or pipelines, for example, and not for traversing channels.

A favorable design of the device in accordance with the invention results in that additional clamping members are disposed on the frame which are distributed about the channel cross-sectional periphery and which can be adjusted and fixed in place radially in a direction toward and away from said longitudinal axis. This design is favorable if the device in accordance with the invention has propulsive elements on the outer circumference for movement in a channel and is to be employed simultaneously for advancing or carrying elongated objects within the channel.

A structurally advantageous development is achieved in that the clamping members are designed as a piston plunger which can be actuated mechanically, pneumatically, hydraulically or electromagnetically.

The device in accordance with the invention can also be designed advantageously such that the frame has a support or carrying device for carrying goods to be transported. For example, a device in accordance with the invention designed in this manner can be employed to transport explosive charges to desired locations of a pre-drilled channel. The device can bring the explosive charges to the predetermined site, deposit it there and then leave the site again. The explosive charge can then be detonated thereafter.

An advantageous construction of the device in accordance with the invention is also achieved in that the frame has a gripping device for picking up and setting down goods. In the case of a device with such a design, it is possible to pick up objects in an inaccessible channel, e.g. drilling debris or rock samples, and to carry them out of said channel. The gripping device, for instance, can be equipped with a plurality of gripping arms which can be actuated mechanically, hydraulically or electromechanically.

A favorable development of the device in accordance with the invention is also that at least one line, for example a fluid hose, is attached at one end of said frame. In this manner, a hose line can be drawn through inaccessible channels by means of the device in accordance with the invention in order to bring fluids to work sites, e.g. the bottoms of boreholes.

A favorable design which facilitates and permits especially careful maneuvering of the device in accordance with the invention in inaccessible channels is achieved in that the drive means of the individual propulsive elements can be regulated independently of one another.

For use in narrow boreholes, the device in accordance with the invention is designed advantageously such that the frame is designed substantially as a circular-cylindrical tube.

Embodiments of the device in accordance with the invention will now be described in the following in conjunction with the drawings, in which:

FIGS. 1a-1d is a partially schematic lateral elevation of a device as prescribed by the invention in accordance with a first embodiment for traversing a channel in four different positions;

FIG. 2 is a partially sectional lateral elevation of one detail of a propulsive element of the device in accordance with FIG. 1;

FIG. 3 is a partially sectional front elevation of the propulsive element in accordance with FIG. 2;

FIG. 5 is a partially sectional lateral elevation of one detail of yet another embodiment of a propulsive element of a device in accordance with the invention;

FIG. 6 is a sectional end elevation of the detail of the propulsive element in accordance with FIG. 5;

FIG. 20 is a ninth embodiment of a device in accordance with the invention in longitudinal section, in use in a channel;

FIG. 21 is an illustration of successive phases of a work cycle executed with the device in accordance with FIG. 20;

Figure 4:
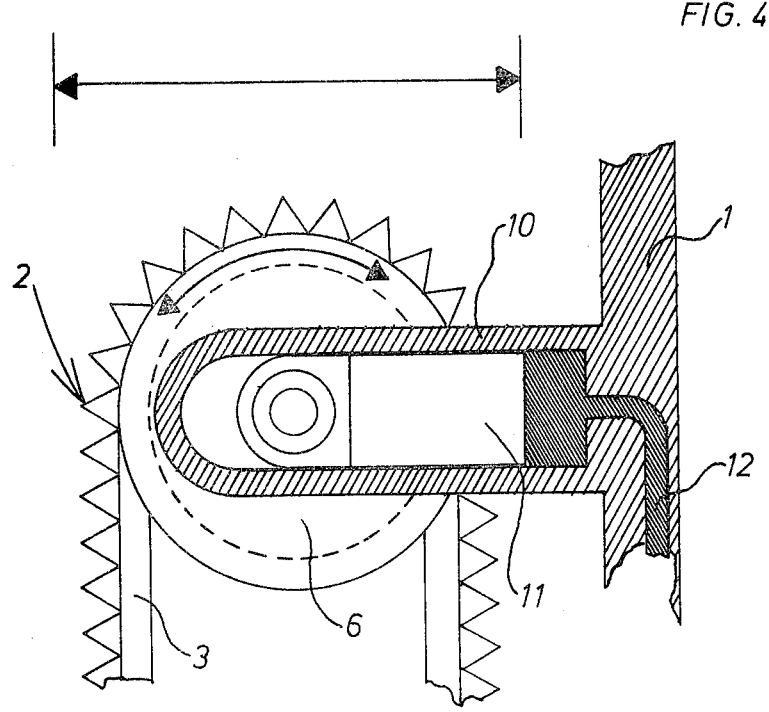
FIG. 4 is a partially sectional lateral elevation of one detail of another embodiment of a propulsive element of a device in accordance with the invention.

A first embodiment of a self-driving and self-locking device for traversing enclosed channels, e.g. boreholes, and for being fixed therein is illustrated in lateral elevation in four different operating positions in FIGS. 1a to 1d. The device has a frame 1 on which propulsive elements 2 are distributed about the outer periphery relative to a longitudinal axis (in the present case the channel axis) which coincides substantially with the direction of advance. The propulsive elements are adjustable both relative to the longitudinal axis in a substantially radial direction relative to the frame to achieve adaptation to the contact surface in the channel and are drivable by means of at least one drive means to produce movement in the desired direction of movement. In the case of the embodiment of the device illustrated in FIG. 1, each propulsive element 2 is designed as a roller-guided, endless, rotating element 3 similar to a caterpillar track. The front guide rollers 4 of each track are driven in the illustrated embodiment by means of one drive means respectively, e.g. an electromotor. An example for a design of such an electromotor drive of each roller 4 will be explained below with reference to FIGS. 5 and 6. For the time being, reference is made to the fact that each roller, whether the driven rollers 4 or the idlers 5 and 6, of each propulsion element is under the influence of a positioning means urging radially outwardly onto the respective contact surface of the inner wall of the channel. These positioning means ensure that the propulsive elements are always in contact with the inner channel walls and can adapt to irregularities in the course of the channel walls. Four different adapting positions of the device are illustrated in FIGS. 1a to 1d. The positioning device for radially adjusting the rollers can be designed as a compression spring device, for instance. One example of such a compression spring device is shown in FIGS. 2 and 3 in use on a reversing roller 6 at one end of a propulsive element 2. The axle 7 of the reversing roller 6 is slidingly conducted in guides 8 extending perpendicular to the main axis of the device and is under the influence of compression springs 9 which are supported on the frame 1 and which urge the roller 6 together with the track 3 outwardly against the channel wall.

The device for positioning the rollers of the track propulsive device 2 of the device illustrated in FIG. 1 can be designed also as an hydraulic device. Such an embodiment is shown in FIG. 4 in use on a positioning device for the reversing roller 6 at the end of a propulsive element 2. In this embodiment, guides 10 are disposed on the frame 1, extend perpendicular to the main axis of the device on both sides of the roller 6, one of which being shown in sectional view in FIG. 1. This guide 10 has an inner cylinder-like part which is open at its upper end and is sealed by a plunger 11 which can reciprocate slidingly in the cylindrical part of the guide 10. At the outer end of each piston, the axle of the roller 6 is rotatably mounted. A hydraulic fluid can be introduced via a line 12 into the space in the inner part of the guide 10 which is closed off by the plunger 11. By regulating the amount of fluid or the pressure of the same, the position of the roller 6 can be changed. In particular, this roller 6 together with the track 3 can be pushed or pressed continuously against the adjacent inner wall.

One development of an electromotor drive of a drive roller 4 of the track-like propulsive element 2 of the device in accordance with FIG. 1 is illustrated in lateral elevation and axial section in FIGS. 5 and 6. In this embodiment, the driven roller, roller 4 in this example, is designed as the rotor of an electromotor at the end of a crawler mounted conveyor 2. The roller supports permanent magnetic poles 13 at each of its two face ends. These permanent magnetic poles 13 cooperate with the opposing electromagnetic poles 14 which are in turn affixed to stators 15 which are mounted in guide plates 16 of the frame 1 so as to prevent rotation about the roller axle and to permit displacement in a direction perpendicular to the main axis of the device. The electromagnetic poles 14 are constructed as cores of magnetizable material wound with conductor coils which are not illustrated in FIGS. 5 and 6 for the sake of clarity. They are connected via electric leads (not shown either) with a current source and a control device which are arranged either in the frame of the device or at a remote site. The axle 7 of the roller 4 is rotatably supported in bearing rings 17 which in turn can be brought into a position pressed against the channel wall by means of positioning devices comprising toothed racks 18 and pinions 19. The positioning devices do not necessarily have to be constructed as rack-and-pinion drives, but may also be constructed as compression spring devices, for instance, as are illustrated in FIGS. 2 and 3 or as an hydraulic device as is illustrated in FIG. 4. In the embodiment according to FIGS. 5 and 6, the roller 4 itself constitutes the rotor of an electromotor. Each roller 4 is thus driven individually. The result is the possibility of individual control of each individual propulsive element in a very simple and spacesaving structure of the drive means.

Figure 7:
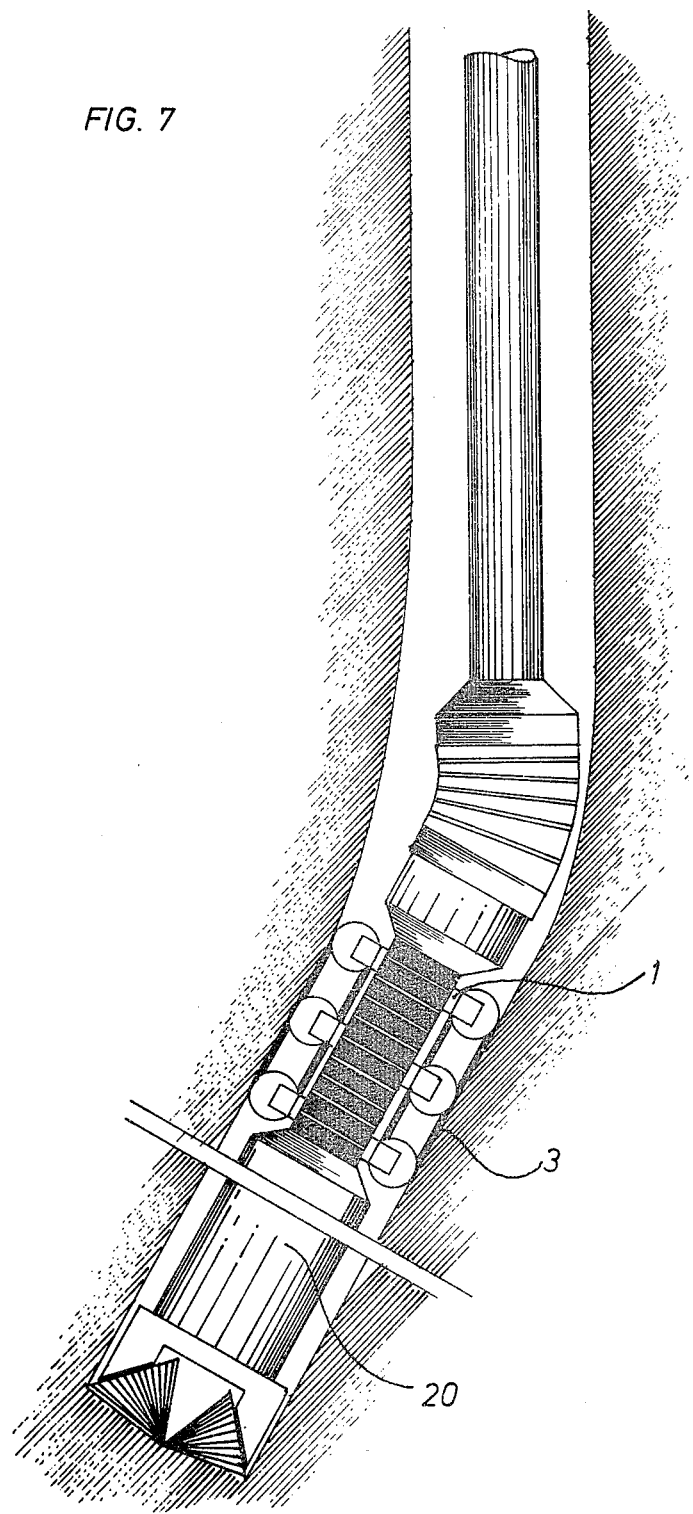
FIG. 7 is a device as prescribed by the invention in accordance with a second embodiment in lateral elevation in the operating position.

A second embodiment of a device in accordance with the invention is illustrated in FIG. 7 in a lateral elevation in its position of operation in a borehole. In this embodiment, the propulsive elements 2 are designed as tracks 3 conducted on rollers and mounted on a frame 1 just like in the embodiment in accordance with FIG. 1. The frame 1 in this embodiment has at its leading end a drilling device 20 which supports a drilling tool in the form of a rotary cone bit (roller bit) at its front end. A flexible hose is attached at the rear end of the frame 1 in which both current supply lines (not shown) for the drive means of the device and the drilling device 20 as well as lines for supplying a fluid to the drilling head are located. In this embodiment, the device presses the boring device supported by the frame 1 against the closed front end (face) of the borehole when the propulsive elements 2 produce an advancing movement, thereby causing the borehole to advance as well. By individually regulating the propulsive elements of the device, e.g. by temporarily stopping the propulsive elements on one side, it is possible to move the device along curved paths as well and to thereby produce curvilinear boreholes. The control of the propulsive elements can be effected in this case by a control device outside the borehole by correspondingly supplying the current.

Figure 8:
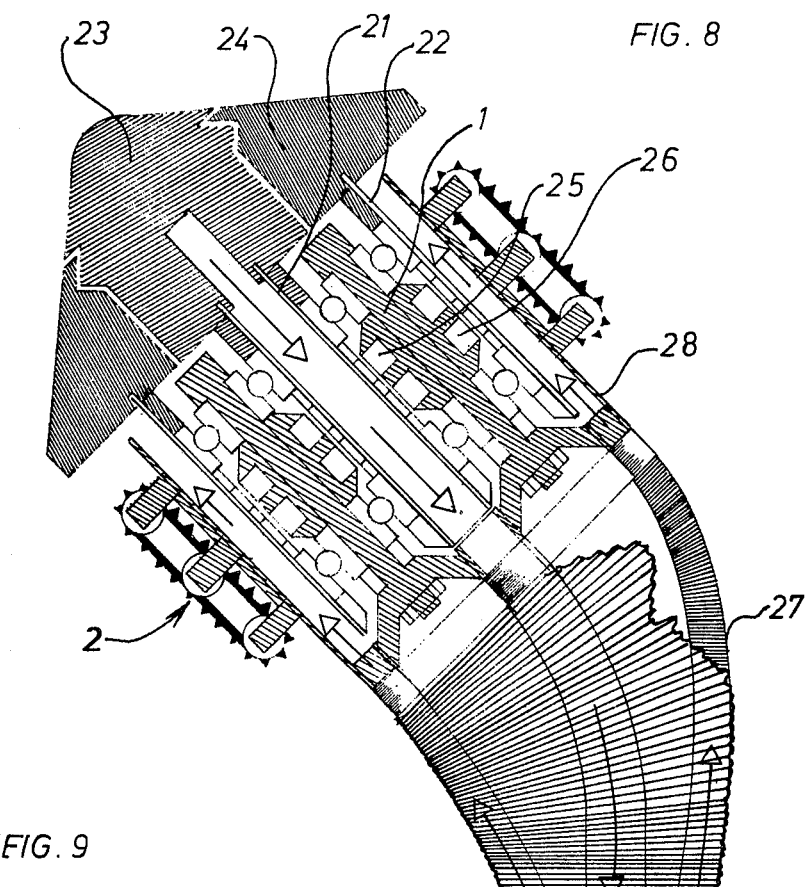
FIG. 8 is a partially longitudinal sectional lateral elevation of a third embodiment of a device in accordance with the invention.
Figure 9:
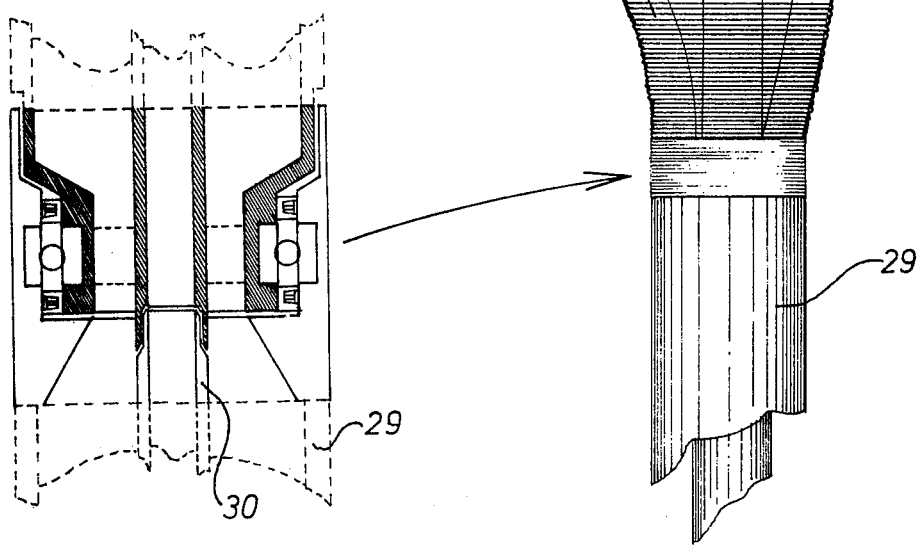
FIG. 9 is a detail of the embodiment in accordance with FIG. 8 in sectional elevation.

A third embodiment of the device for traversing closed channels is shown in FIG. 8. This embodiment serves to produce boreholes in soil exactly as the embodiment shown in FIG. 7. Insofar as parts of the embodiment in accordance with FIG. 8 coincide with parts of the afore-discussed devices, the same reference numerals will be used. Repeated discussion of these parts will be omitted. Two tubular mounts 21 and 22 are mounted on the frame 1 of this device to be concentrically rotatable to one another. A drilling tool 23 or 24 is respectively secured to each mount 21 or 22. The frame 1 possesses electromagnetic poles 25 and 26 which are distributed about its periphery in two circles of different radii and which cooperate with opposite permanent magnetic poles on the mounts 21 or 22 and respectively constitute an electromotor. The poles 25 and 26, which are formed from cores of magnetizable material wound by conductor coils, are supplied with current from a control device and a current source located outside the borehole via lines (not shown) laid in the frame 1. The drilling tools 23 and 24 are driven counter-rotatingly by the electromotors formed in this way. A flexible hose 27 is connected at the rear end of the frame 1 which has flexible lines for supplying fluid to the drilling tools and for removing fluid from the bore located in its interior. The fluid lines are provided in the frame 1 as channels defined by the mount 21 or by the mount 22 and an outer casing 28. The connection of the fluid supply and removal lines to the device is illustrated in detail in FIG. 9. It is obvious that the fluid supply line is encompassed by a flexible hose 29 whose leading end is connected with a flexible connecting part at the end of the frame 1 via a ball bearing. Another flexible line 30 extends concentrically to and inside the line 29, is also connected to the end of the frame 1, e.g. by screwing, and removes the fluid from the borehole of the bore. Boreholes can be advanced with the aid of the device illustrated in FIGS. 8 and 9. To this end, the device is advanced by means of the propulsive elements 2 and simultaneously the drilling tools 23 and 24 are driven. The borehole advances according to the forward movement produced by the device and the drilling output of the drilling tools. By individually controlling the propulsive elements, it is also possible in the case of this device to produce boreholes with a curved path if this is desired.

Figure 10:
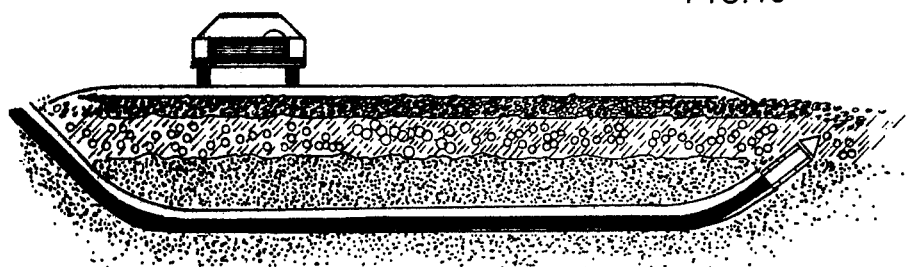
FIG. 10 is an example of the use of a device as defined by the invention in accordance with FIGS. 7–9.
Figure 11:
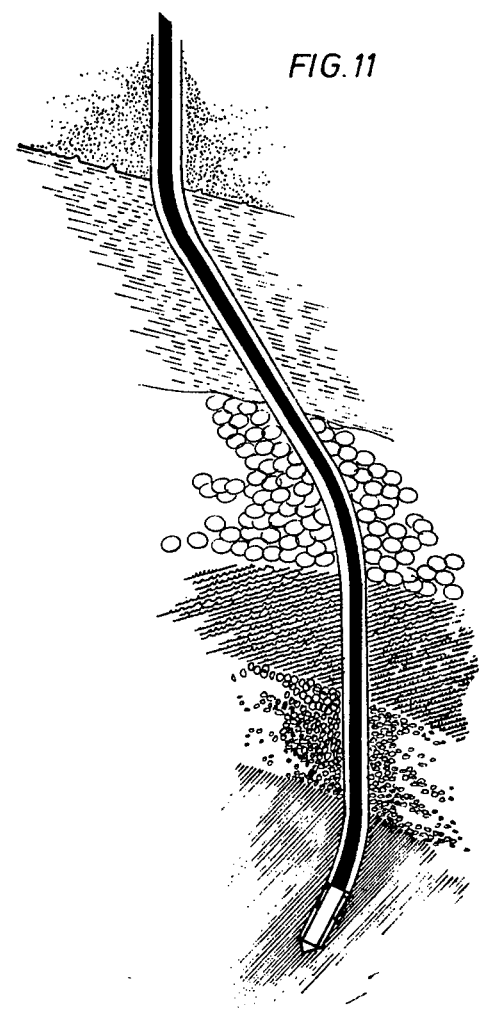
FIG. 11 is another example of the use of a device in accordance with FIGS. 7–9.

Examples of applications for the device illustrated in FIGS. 7 and 8 are shown in FIGS. 10 and 11. The case in accordance with FIG. 10 is involved with laying a supply line, e.g. a current supply line, beneath a road carrying traffic without necessitating an interruption of this traffic. The bore is initially conducted downwardly in a curve at the edge of the road, is then conducted horizontally in another curve and is finally conducted upwardly again in yet another curve on the other side of the road. The supply line can be introduced subsequently into the channel drilled in this manner. To pull the line through the channel, a device in accordance with the invention can also be used which pulls the leading end of the supply line through the curved channel. In the case shown in FIG. 11, a bore is advanced through a sequence of different layers of rock. The bore is to be conducted in each layer of rock at a different angle relative to the main direction of this layer.

Figure 12:
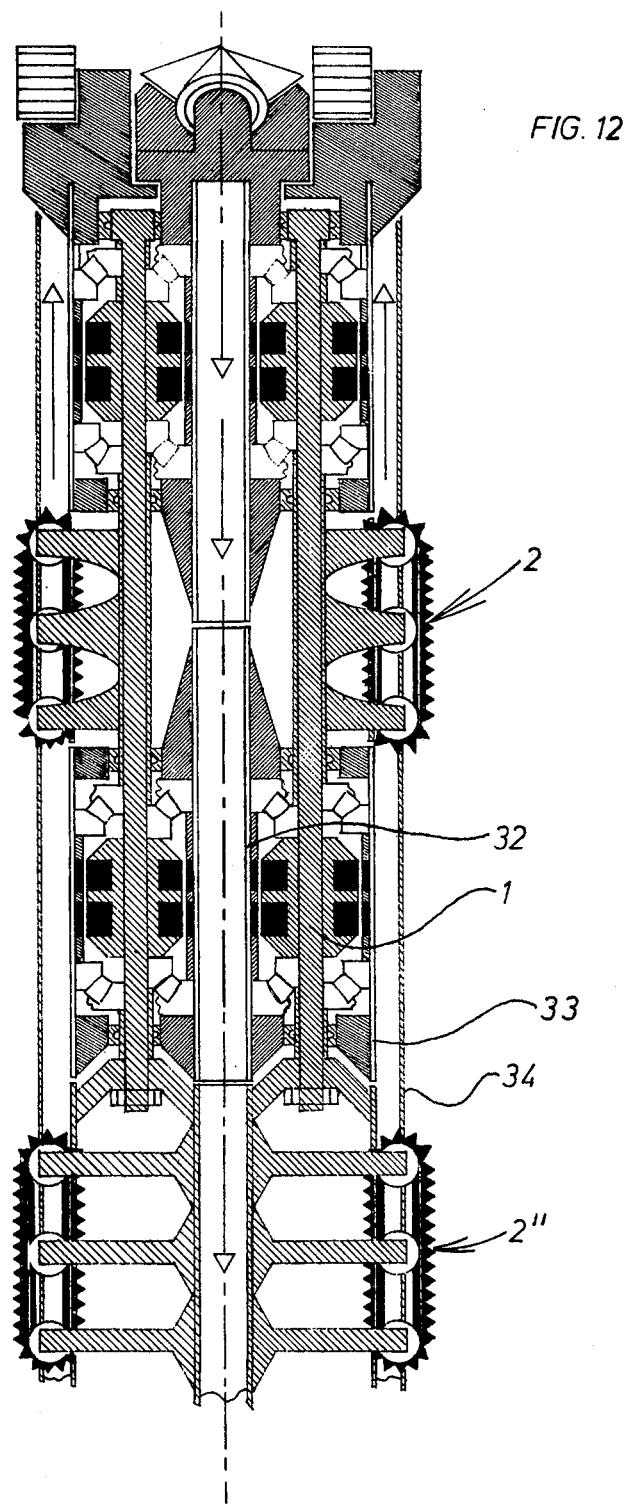
FIG. 12 is a fourth embodiment of a device in accordance with the invention in longitudinal section.

Another embodiment of the device is illustrated in FIG. 12 in which the frame 1 has two propulsive element 2 and 2″ in the form of tracks which are distributed on the periphery at locations in back of one another in the direction of the longitudinal axis of said device. A drilling device comprising two counter-rotating drilling tools and constructed in principle like the drilling device explained in conjunction with the device according to FIG. 8 is mounted on the frame 1 at the front end. In the central segment of the frame a pipe section 32 is mounted and concentrically encloses the longitudinal axis. In addition, another pipe jacket 33 concentrically enclosing said pipe section 32 is rotatably supported in this area of the frame. Both the pipe section 32 as well as the pipe jacket 33 can be driven electromotively. To this end, an electromotive drive means can be used which can be designed in principle just like the electromotive drive means of the mounts of the drilling tools. Reference is made in this context to the structure of the drilling device in FIG. 8. Inwardly projecting vanes which are not shown in FIG. 12 for the sake of clarity can be provided in the pipe section 32. Likewise, vanes projecting radially outwardly (not shown either) may also be provided on the outer circumference of the jacket sections 33. The housing 1 includes a casing 34 surrounding the device externally in a cylindrical manner and which, together with the jacket section 33, defines a channel having a circular cross-section. The inner pipe section 32 and the jacket section 33 act as pumps during rotation due to the mounted vanes which serve to pump fluid to and away from the drilling tools. A structure is provided at the rear end of the frame 1 on which the other propulsive elements 2″ are mounted. By arranging propulsive elements at two locations along the length of the device, one can exert greater force on the walls of the traversed channel and greater force of forward movement on the drilling device secured to the device. The device illustrated in FIG. 12 is thus suitable for advancing boreholes through material in which it is difficult to bore and for producing boreholes having a relatively large diameter.

Figure 13:
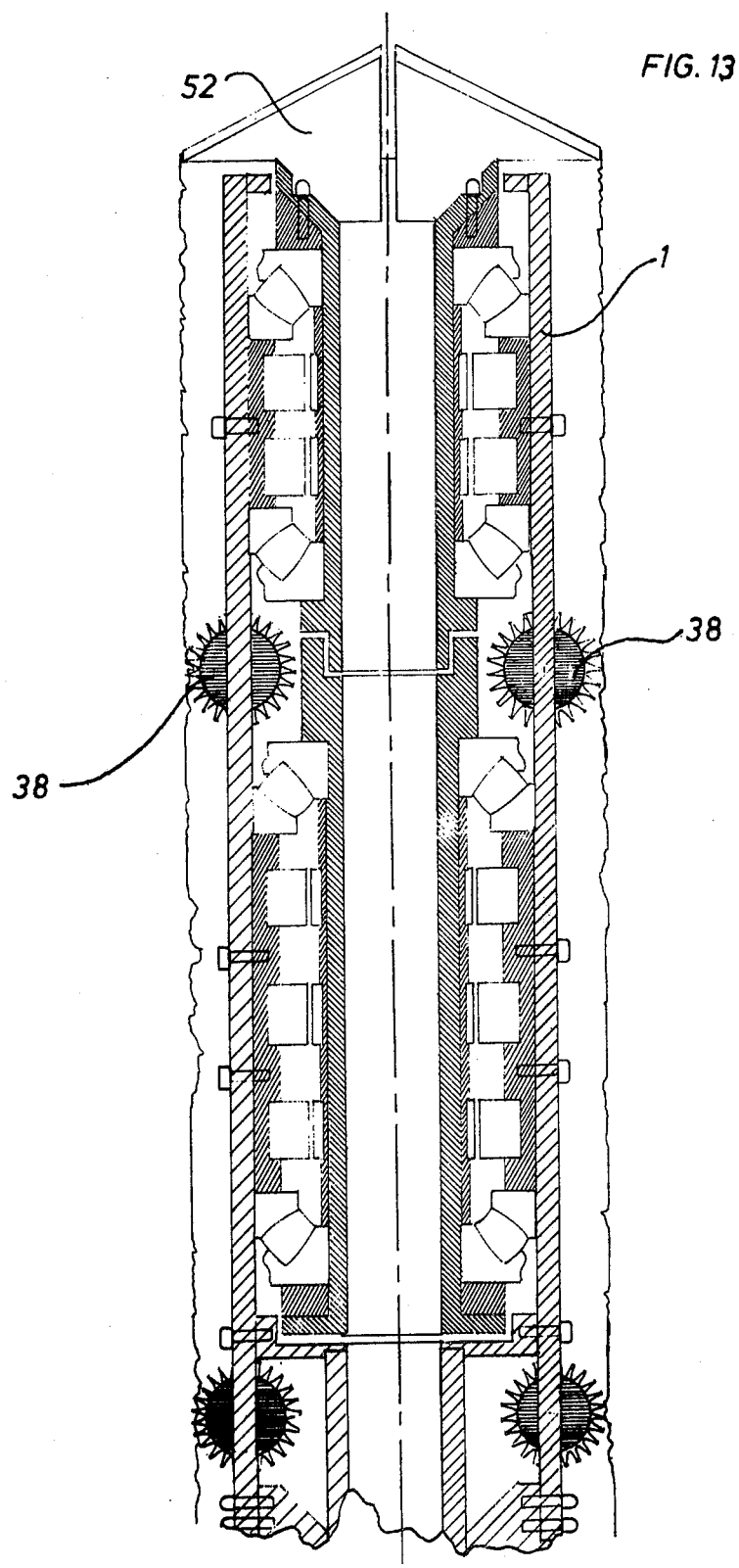
FIG. 13 is a fifth embodiment of a device in accordance with the invention in longitudinal section.

A device is shown in FIG. 13 in which the propulsive elements are not designed as tracks, but rather as wheels 38 provided with radial traction teeth. Each of these wheels is mounted in the frame 1 and can be both adjusted radially outwardly by means of a positioning device and driven in the transport direction. The positioning devices and the wheel drive means can be designed analogously to those of the rollers of the track-like propulsive elements which were described with reference to FIGS. 2 and 6. In the device in accordance with FIG. 13, a drilling device in a rotating drilling tool 52 is rotatably mounted in the frame 1 which has a substantially tubular construction in this case. The tubular mount of the drilling tool 52 forms a rotor of an electromotor supporting permanent magnetic poles 60. The stator of this electromotor is formed by the frame 1 which supports electromagnetically excitable poles 61. The electromagnetic poles on the frame 1 are supplied with current from a control device located outside the bore via lines which are not illustrated. In this device in which only one drilling tool is provided which rotates in one direction of rotation, the torque exerted on the drilling tool must be absorbed by the frame 1 and supported on the inner channel wall in order to prevent the entire device from counter-rotating relative to the drilling tool. The frame 1 is supported by means of wheels 38 for this purpose which are pressed outwardly against the inner bore wall by positioning devices during the drilling operation with such pressure that the device is locked to prevent counter-rotation. In the center segment of the frame 1 of the device, a tubular segment 62 is rotatably mounted in this embodiment as well which is driven by an electromotor composed of permanent magnets mounted on tubular segment 62 and electromagnetically excitable poles 64 mounted on frame 1 and supports pump vanes (not shown) in its interior so that fluid can be pumped into or out of the borehole bottom by means of the pump formed in this manner. A supply line for feeding fluid or for removing the same is connected at the end of the frame 1.

Figure 14:
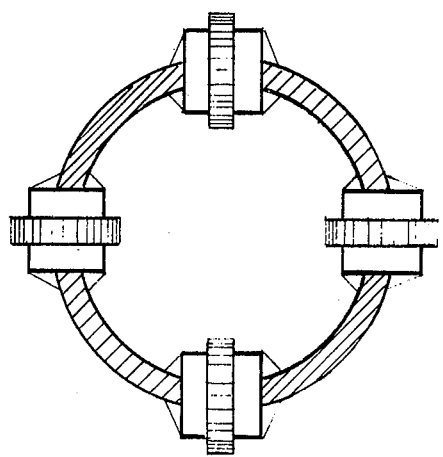
FIG. 14 is a sectional elevation through the device in accordance with FIG. 13 corresponding to the sectional line XVII—XVII in FIG. 13.
Figure 15:
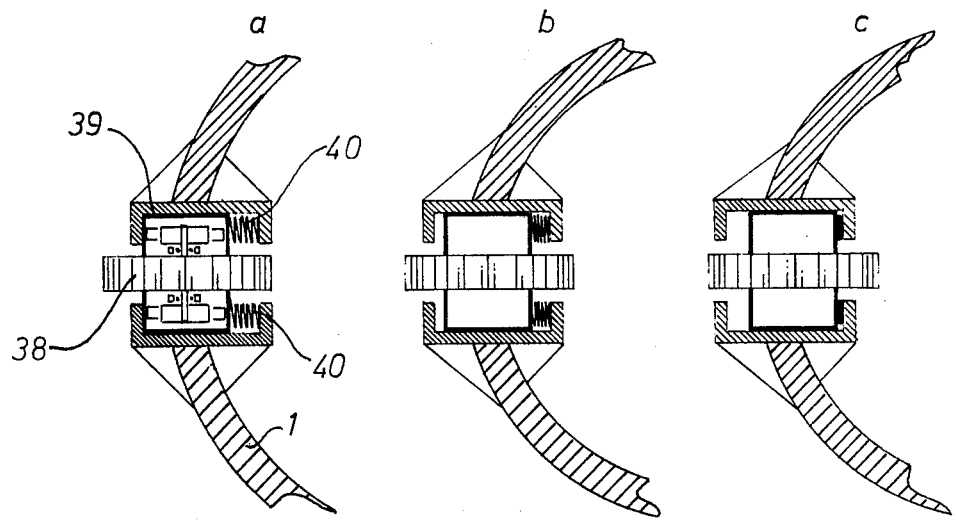
FIG. 15 is a sectional elevation through a propulsive element of the embodiment in accordance with FIG. 13 in three different positions.

The arrangement of the wheels serving as propulsive elements in the case of the device in accordance with FIG. 13 on the circumference of the frame 1 is illustrated in FIG. 14. An embodiment for mounting each of the wheels 38 is shown in FIG. 15 in which three different positions of a wheel 38 are illustrated in FIGS. 15a, 15b, and 15c. In the case of the embodiment in accordance with FIG. 15, each wheel 38 is designed as the rotor of an electromotor which cooperates with two stators at both faces of the rotor in a manner as was illustrated in FIGS. 5 and 6 for the electromotor drive of a roller. The stators in turn, together with the wheel 38, are arranged in a housing which can be slid radially in a guide 39 secured to the frame 1. The housing is under the influence of compression springs 40 which automatically press outwardly against the inner wall of the borehole being drilled. The extreme outer position of a wheel 38 is illustrated in FIG. 15a, a middle position in FIG. 15b and the extreme inner position in FIG. 15c.

Figure 16:
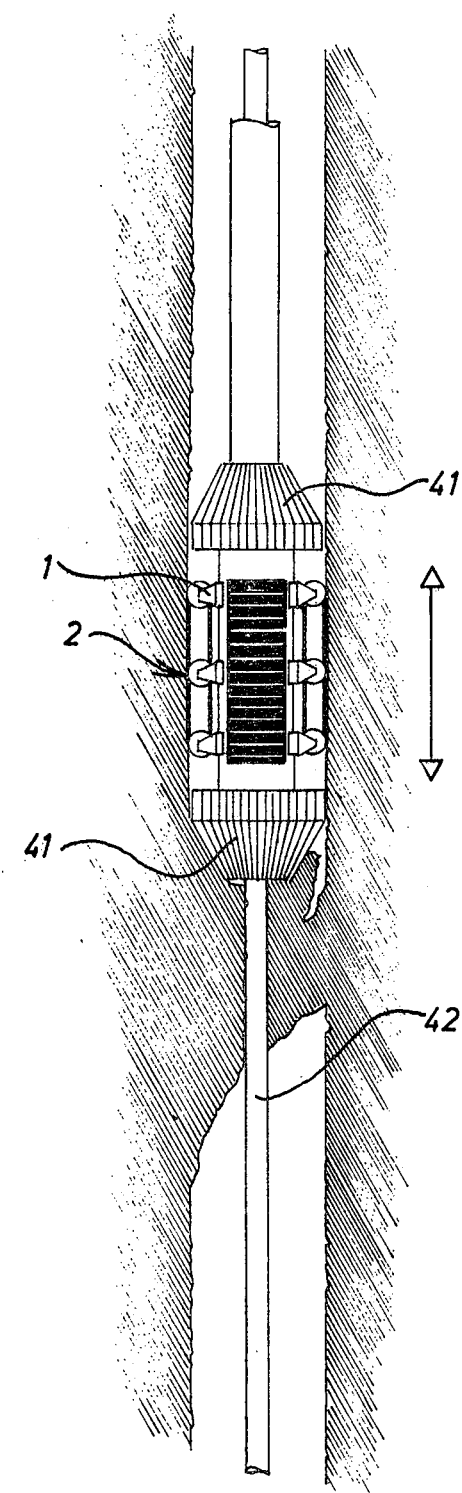
FIG. 16 is a lateral elevation of a sixth embodiment of a device in accordance with the invention in use in a borehole.

A sixth embodiment of the device is illustrated in its operative position in FIG. 16. In this embodiment, drilling devices 41 are arranged at both ends of the frame 1 which can be moved in a channel by means of the propulsive elements 2. Each of these drilling devices 41 could be designed in principle like the drilling devices shown in the embodiments according to FIGS. 12 and 13. By arranging drilling devices at both ends, there is a possibility of advancing a borehole in two opposing directions or to expand or subsequently process a borehole should the walls collapse or cave in.

The embodiment illustrated in FIG. 16 is also special in that it has a central channel. A line 42 which has already been laid in an existant bore can pass through this central channel, for example. The device illustrated in FIG. 16 can thus serve to reopen channels in which there are already lines, in particular pipelines, and which are clogged at specific locations due to the collapse of the channel walls so that there is danger of the laid lines being damaged. These channels can thus be reopened without having to remove the line from the channel in so doing.

Figure 17:
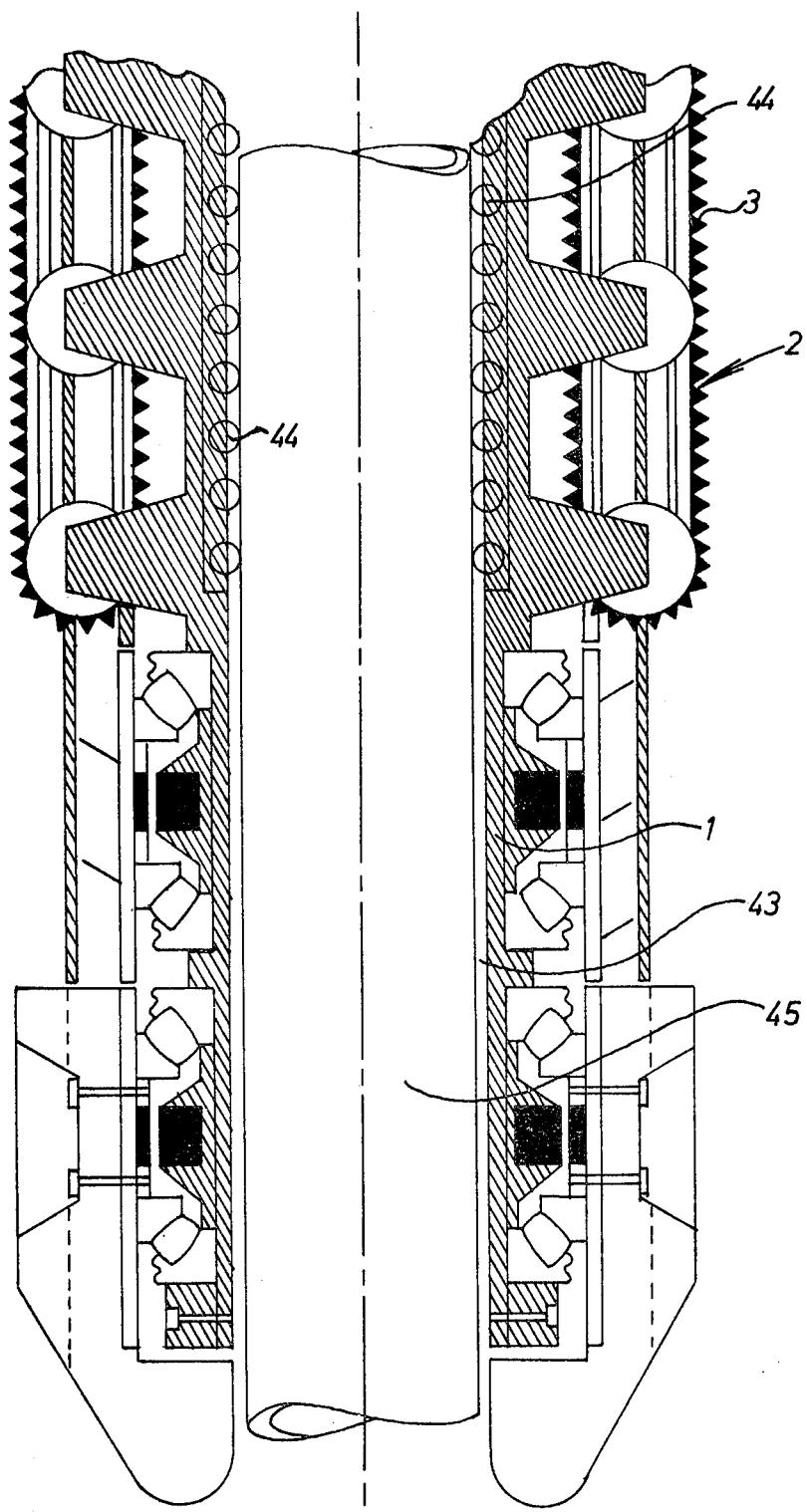
FIG. 17 is a sectional elevation of a portion of the device in accordance with FIG. 16.

A special embodiment of a device as shown in operation in FIG. 16 is illustrated in longitudinal section in FIG. 17. Only one drilling device is shown at one end of the device. At the other end of the device, another drilling device is arranged in a symmetrical fashion. Each drilling device is driven by an electromotor. The drive means can be designed and constructed in the manner explained in principle in the case of the drilling device in the embodiment according to FIG. 13. A central channel 43 is provided in the interior of the frame 1 of the device into which guiding members project which are in the form of rotatably supported rollers 44, are distributed around the circumference of the channel 43 and are supported on the frame. A pipeline 45 which has already been laid in a channel can be maintained concentrically to the frame 1 of the device by means of said rollers 44 and the device can move in the channel when driven by the propulsive elements 2 and, if desired, can open up clogged or jammed portions of the channel without pulling the line 45 along or damaging it.

On the other hand, it is also possible to drive the rollers 44 in a direction of movement extending in the direction of the longitudinal axis of the device. An electromotor drive can be used for this purpose, for example, as was explained in principle with reference to FIGS. 5 and 6. It is then possible, for example, to maintain the frame 1 of the device in a stationary position by radially spreading the propulsive elements 2 and then drive only the rollers 44 in a desired direction of movement. The line 45 between the rollers 44 can be moved in the desired direction of movement relative to the stationary frame 1 of the device and thus be introduced into or withdrawn from a channel, for instance.

Figure 18:
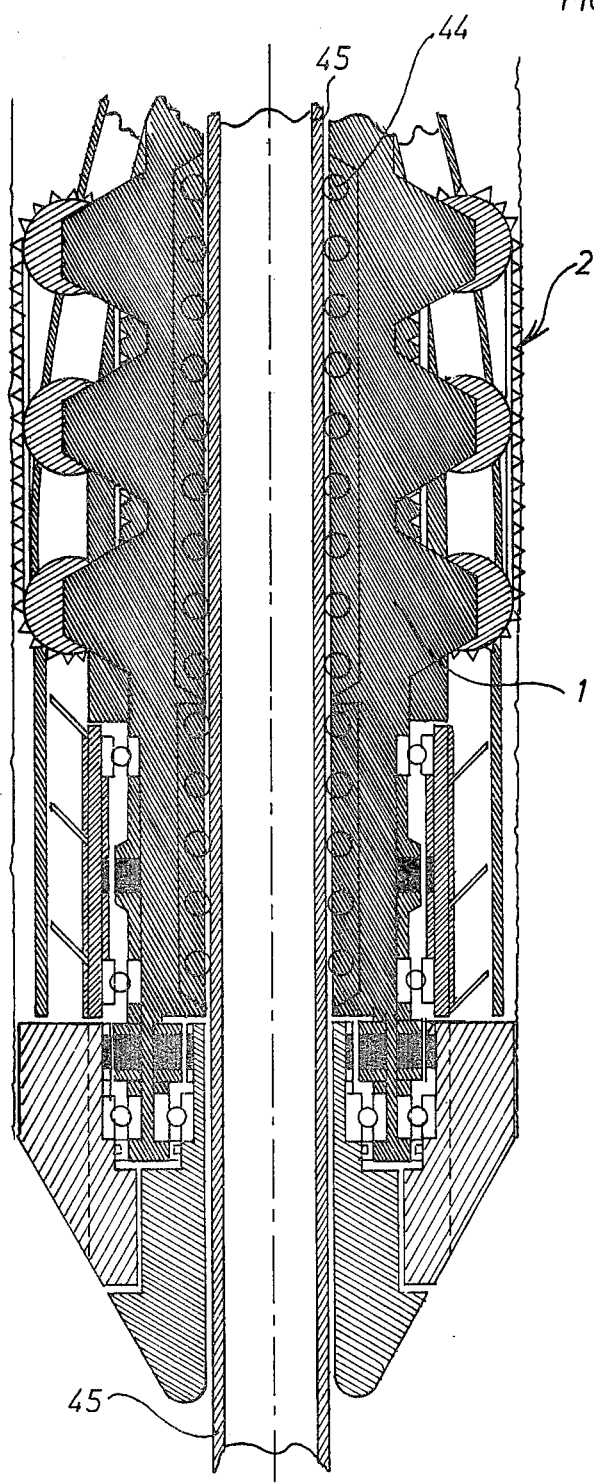
FIG. 18 is a seventh embodiment of a device in accordance with the invention in longitudinal section.

Another embodiment of a device is illustrated in FIG. 18 which is similar in application and in structure to the device illustrated in FIG. 17, in which however a drilling device is provided only at one end. On the other hand, this drilling device has two counter-rotating drilling tools. Insofar as parts of the device according to FIG. 18 coincide in principle with parts of the device according to FIG. 17, the same reference numerals have been used.

Figure 19:
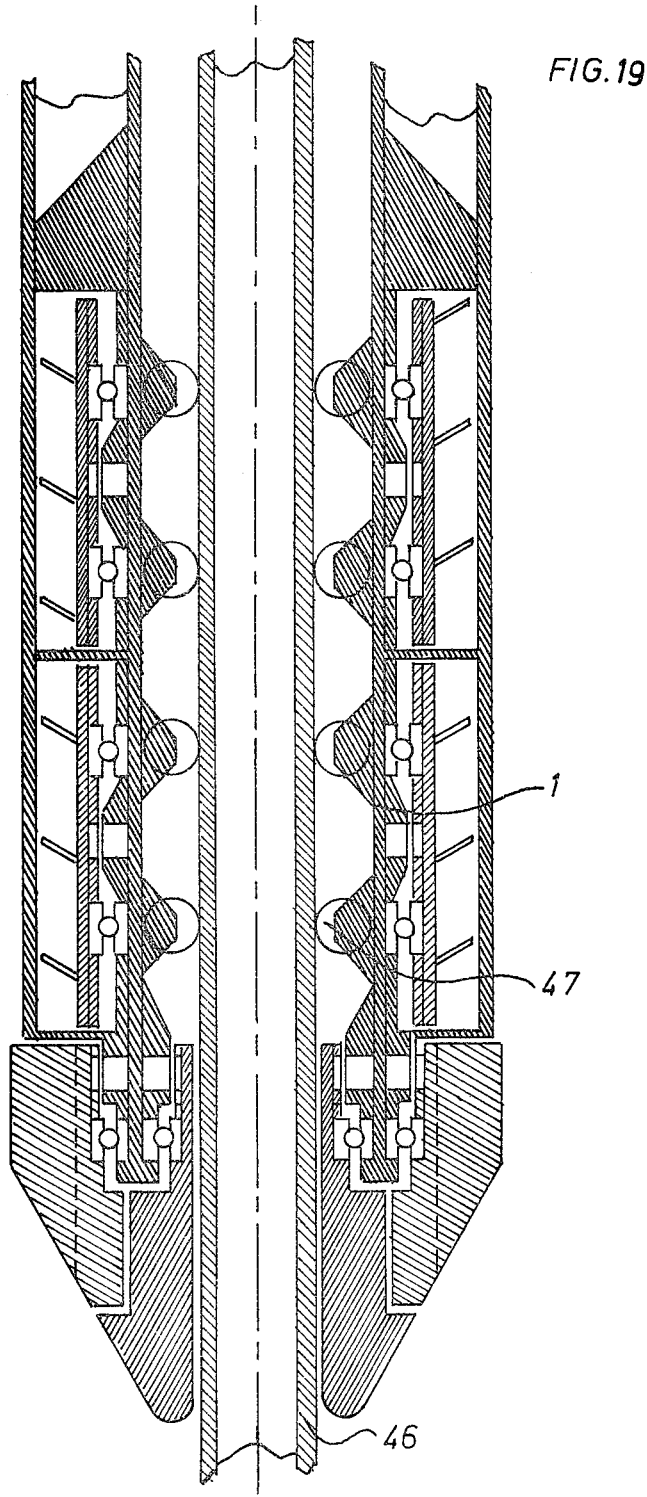
FIG. 19 is an eighth embodiment of a device in accordance with the invention in longitudinal section.

Another embodiment of the device is shown in FIG. 19 which does not serve to traverse the inner walls of channels, but rather to traverse the outer walls of elongated objects, e.g., a pipeline 46. In this embodiment, transport elements designed as rollers 47 are disposed on the inner circumference of a tubular frame 1 and are distributed over the length of the frame 1. Each of the rollers 47 can be adjusted radially inwardly by means of a positioning device and can be driven individually by a drive means. The positioning devices and the drive means can be constructed analogously to the positioning devices and the electrical drive in accordance with FIGS. 2 to 6. A drilling device with two counter-rotating drilling tools driven by electromotors is again provided at one end of the frame 1 in this embodiment of the device. These drilling tools are advanced in that the frame is pushed forward along the line 46 by means of the rollers 47. This is only possible of course if the line 46 has a resistant construction, e.g. consisting of a strong metal pipe, or if the forces which occur during drilling are only slight, e.g. if an already existing channel in which the line 46 has been laid is only to be freed of impurities by means of the drilling tools. The device in accordance with FIG. 19 has pumps driven by electromotors inside its outer casing. By means of these pumps, a cleaning fluid can be pumped into or out of the channel surrounding the line 46.

Yet another embodiment of the device is illustrated in FIG. 20 in longitudinal section. This embodiment is designed as a transport device which is to serve to introduce objects into inaccessible channels and to deposit them at predetermined locations. The device has a frame 1 on which track-like propulsive elements 2 are mounted about the circumference. Said propulsive elements can be radially adjusted by means of positioning devices and can be driven individually by a drive means. Reference is made to the embodiments explained with reference to FIGS. 2 to 6 concerning the construction of the positioning devices and the drive means. The frame 1 has a channel in its interior into which driveable transport rollers 48 project which can be driven in a desired sense of rotation. Moreover, additional clamping members project into this channel of the frame 1 which are distributed about the channel cross-sectional circumference and which are designed in the illustrated embodiment as cylinder-plunger units in which the plungers can be moved radially toward and away from the longitudinal axis of the device. The embodiment according to FIG. 20 can be regarded as a transport device which can serve to convey goods, e.g. ignition charges 50, which can be mounted in the frame 1 by means of the clamping devices 49, to a desired location in a pre-drilled channel. When this location has been reached, the clamping devices 49 can be released and the ignition capsule 50 can then be moved out of the frame by means of the transport rollers 48 and deposited at the predetermined location in the channel. Subsequently the device can be driven out of the channel again by means of the propulsive elements 2. Finally, the explosive can be ignited either via wireless control or via an ignition line which is not illustrated in FIG. 20 and which can be carried along by the device as it transports the ignition charge into the channel.

FIG. 21 illustrates three essential work cycles of the aforedescribed operation. In FIG. 21a the device transports the ignition charge to the predetermined site. FIG. 21b shows how the ignition charge was deposited and how the device moves outwardly again. As soon as the device has left the channel, the detonation illustrated in FIG. 21c can occur.

Figure 22:
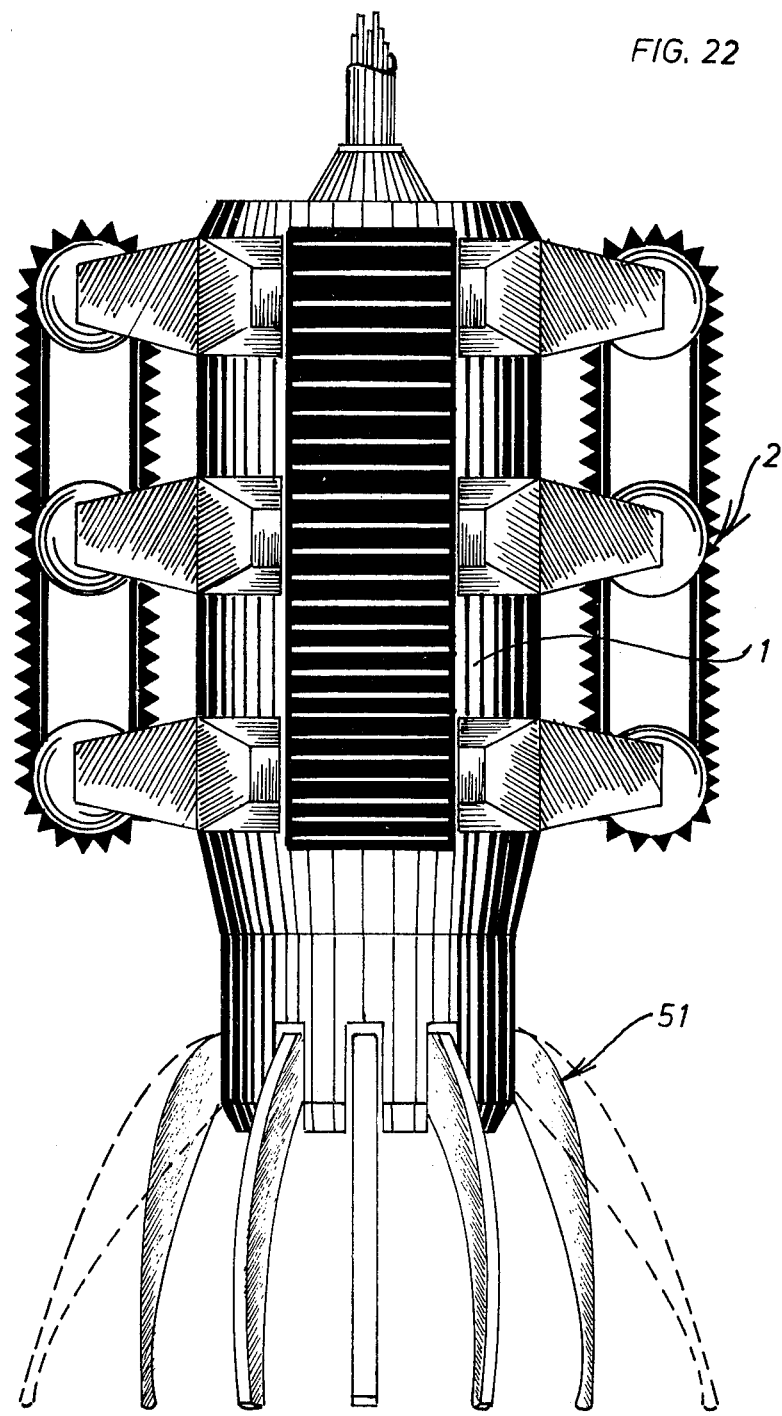
FIG. 22 is a tenth embodiment of a device in accordance with the invention in lateral elevation.

An embodiment of the device is illustrated in FIG. 22 in which a gripping device 51 is connected with the frame 1. The gripping device has a plurality of electromechanically actuatable gripping arms. It is possible, for example, with this embodiment of the invention to extract rock samples and debris from a borehole.

Figure 23:
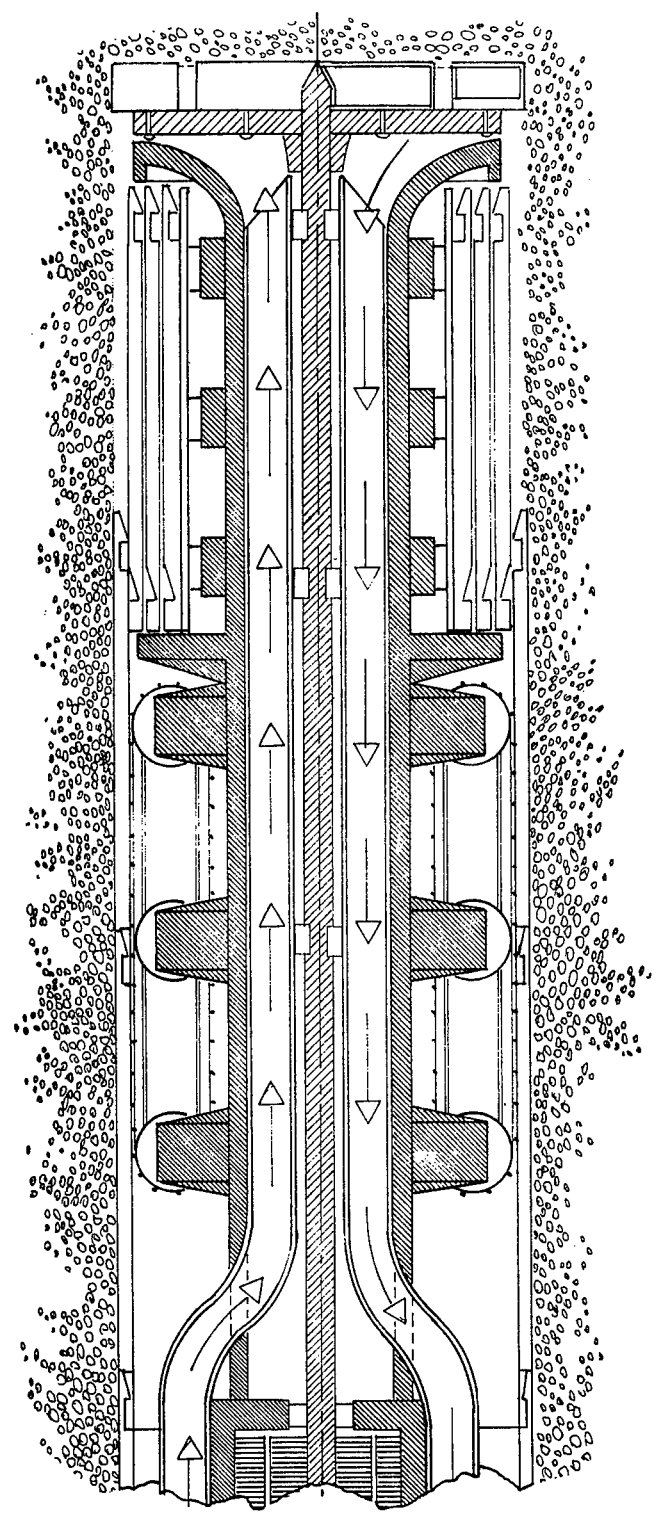
FIG. 23 is an eleventh embodiment of a device in accordance with the invention in longitudinal section.

FIG. 23 shows a further embodiment of a device according to the invention. This device is especially adapted for laying pipes in tunneling operations. From left to right in FIG. 23, can be seen, first, a drill drive motor 65 surrounded by the inlet and outlet pipes which conduct compressed air to remove the debris from the borehole. Next follows the caterpillar treads 66 and mechanisms which drive and direct the drill 67 against the work surface. Next follows the pipe laying device 68 which forces expansible pipes to be described in more detail in connection with FIGS. 24 to 26 against the wall of the borehole as they are required. Facing the work surface is shown a drill having extensible peripheral drill bits whose function is to drill to the proper hole diameter, which, upon retraction of the drill bits, permits the drill head to retract itself within the interior diameter of the laid pipe. As can further be seen from FIG. 23, the pipe lying section of the device can carry a large supply of rolled expansible pipes, which automatically engage each other at each end forming a continuous hermetic lining inside of the borehole.

Figure 24:
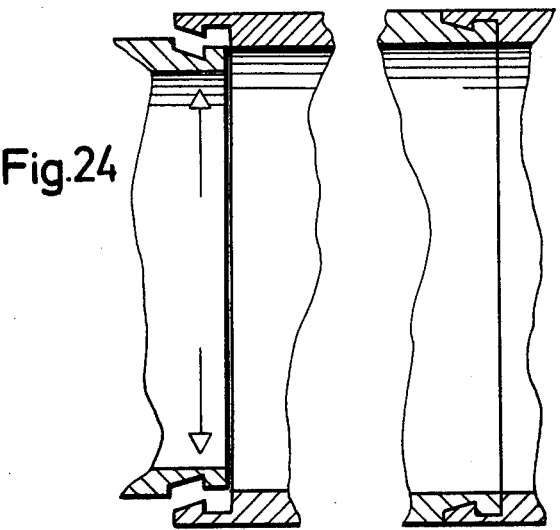
FIG. 24 is a sectional elevation through pipes laid by the device according to FIG. 23.
Figure 25:
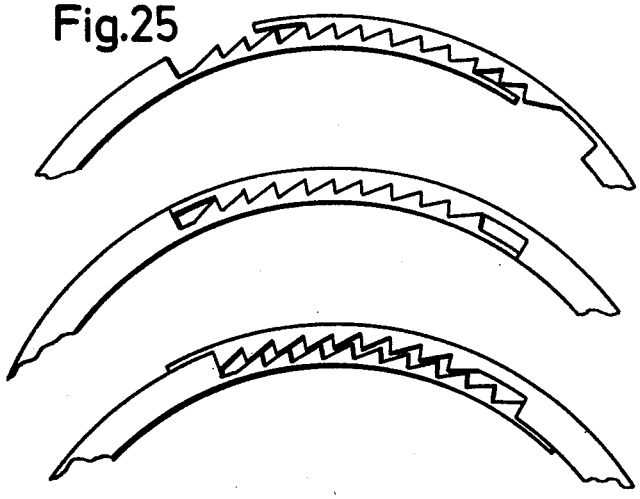
FIG. 25 is a cross-sectional view of the pipes shown in FIG. 24 in three different peripheral positions.

In FIG. 24 there is shown how expansible pipes carried by the device according to FIG. 23 and laid in a tunnel drilled by the device according to FIG. 3, engage each other in the axial direction after being laid in place. FIG. 25 shows how the expansible pipes engage peripherally so as to remain fixed in position against outside pressure without slipping or collapsing. FIG. 25 shows an expansible pipe in three different positions depending on the diameter of the hole drilled and lined by the pipe. Each of these pipes is made of a material which is sufficiently flexible to allow for peripheral expansion of the pipe and for adaptation to the respective diameter of the hole drilled. For instance, the pipes may be made of plastic material. At the outer circumference of each of the pipes there may be provided an elastic hook, for instance in the form of a rubber band or a steel wire coil spring, which hook prevents the pipe from expanding indefinitely and opening in an uncontrolled way in case expansion is not limited by the inner wall of a hole bored but is more or less unlimited, for instance in case a cavern is encountered during the drilling operation. The intermeshing teeth at the opposing longitudinal and circumferential ends of each pipe allow for interconnection with the neighboring pipes and of the circumferential ends of each pipe in its proper position.

Figure 26:
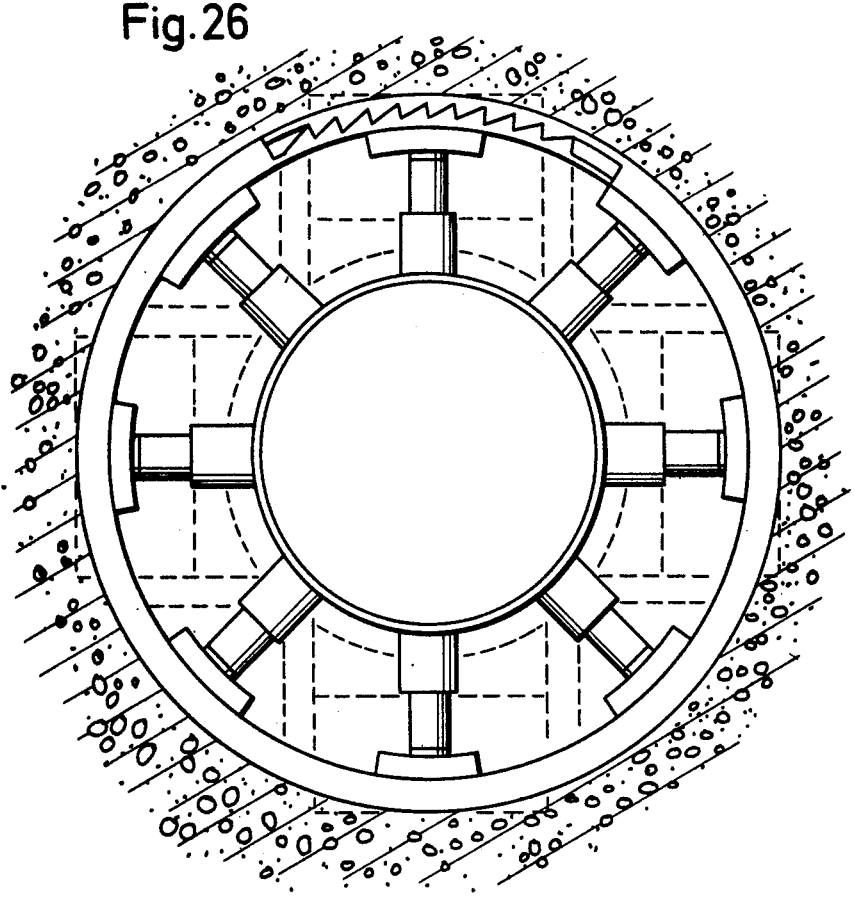
FIG. 26 is a sectional view of a device according to FIG. 23 and of the pipes laid thereby.

In FIG. 26 a sectional view of a device according to FIG. 23 is shown during pipe laying and positioning operation. The device shows pressure cylinder means which can be moved radially outwards and by which it is possible to place a pipe segment into position in the tunnel drilled and to fix it there. Once the pipe has been brought into its position, the cylinder means may be radially retracted again and the device may move forward.

Figure 27:
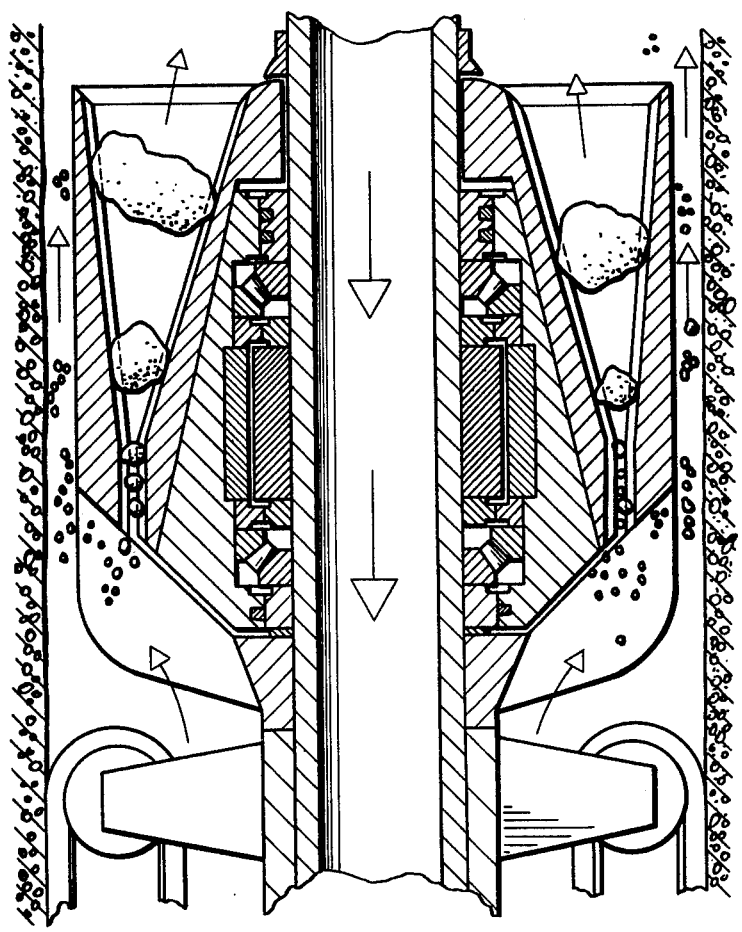
FIG. 27 is a twelfth embodiment of a device in accordance with the invention in longitudinal section, in use in a channel.

FIG. 27 shows a further embodiment of the device according to the invention with the upper gyratory or cone crusher. The function of the crusher is to reduce the falling debris to a size with which the flow water or drilling mud can fluidize and carry it away. The gyratory crusher will prevent falling debris from jamming the caterpillar treads, which as shown in FIG. 27, are behind the crusher. Following the caterpillar treads is located the pump arrangement which accelerates the fluid flow and shearing removal of ground material (not shown in FIG. 27 for clarity reasons). At the head of the arrangement is located the counter-rotating drill head with its drive motor (which is also not shown in FIG. 27 for clarity reasons). At the head of the arrangement is located the counter-rotating drill head with its drive motor (which is also not shown in FIG. 27 for clarity reasons). This embodiment of the device according to the invention can be used for drilling in hard formations where no pipe laying is required.

The invention is not limited to the illustrated embodiments. For instance, it is also possible to provide the frame 1 with additional spreading arms which can be adjusted radially outwardly and which can be pressed outwardly with great force in order to lock the frame at a specific location in a channel instead of the propulsive elements. In such a development of the invention, the propulsive elements serve exclusively to advance the device in its longitudinal direction.

It is also possible for example to design the electromotor drive of the drilling tools in the device in accordance with the invention such that both the respective stator as well as the respective rotor support electromagnetic poles, e.g. poles consisting of cores wound with conductor cells.

Moreover, it is also possible for example to employ commercial drilling devices instead of the drilling devices which were described in a few of the afore-stated embodiments. The essential structure of said drilling devices constitutes the subject matter of applicant's copending application Ser. No. 740,877 filed Nov. 11, 1976.

All features revealed by the specification, the description and the drawings including the constructive details can be essential to the invention even in arbitrary combinations with one another.

What is claimed is:

1. A self-driving and self-locking device for traversing the inner walls of channels enclosed on all sides, or for traversing the outer casing of structures with a substantially constant cross-section over their lengths, and for affixing itself thereon, comprising a frame, propulsive elements disposed on said frame and individual drive means for each of said propulsive elements to produce movement in the desired direction of movement of said device, said propulsive elements being distributed about the outer or inner circumference relative to a longitudinal axis coinciding substantially with the direction of forward movement and adjustable with respect to the longitudinal axis in a substantially radial direction relative to said frame to adapt to the contact surfaces in the channel or on the elongated structure.

2. The device according to claim 1, wherein each propulsive element is a roller-guided endless rotating element.

3. The device according to claim 1, wherein each propulsive element is a wheel or cylinder.

4. The device according to claim 2, wherein said drive means is an electromotor and at least one roller of each propulsive element is driven by said electromotor.

5. The device according to claim 3, wherein said drive means is an electromotor and each wheel or cylinder is driven by said electromotor.

6. The device according to claim 4, wherein said driven roller is designed as the rotor of an electromotor.

7. The device according to claim 5, wherein each driven wheel is designed as the rotor of an electromotor.

8. The device according to claim 6, wherein each roller designed as the rotor of an electromotor supports on its front ends permanent magnetic poles and each frame has mounted thereon stators with poles supplied with current which coact with said magnetic poles.

9. The device according to claim 7, wherein each wheel designed as the rotor of an electromotor supports on its front ends permanent magnetic poles and each frame has mounted thereon stators with poles supplied with current which coact with said magnetic poles.

10. The device according to claim 1, including a positioning device which radially urges the propulsive element onto the respective contact surface of the inner channel wall or the outer wall of the elongated structure.

11. The device according to claim 10, wherein each positioning device is designed as a compression spring device.

12. The device according to claim 10, wherein each positioning device is designed as an electromechanical device.

13. The device according to claim 10, wherein each positioning device is designed as a pneumatic device.

14. The device according to claim 10, wherein each positioning device is designed as a hydraulic device.

15. The device according to claim 7, wherein the positioning device can be locked in place in any desired position.

16. The device according to claim 1, including work devices connected to said frame, said propulsive elements being disposed on the outer circumference of the frame and that said frame is connected with said work devices which are advanceable by means of said device.

17. The device according to claim 16, wherein the work device is a drilling device.

18. The device according to claim 17, wherein said drilling device is disposed on the front end of the frame in the direction of movement.

19. The device according to claim 17, wherein drilling devices are arranged on both ends of the frame.

20. The device according to claim 10, including means on said frame for supporting and for advancing a drilling device in the direction of the borehole channel to which a drilling device can be secured.

21. The device according to claim 20, wherein said means are a hydraulic or pneumatic cylinder-plunger unit.

22. The device according to claim 20, wherein said means are a toothed rack driven by means of pinions which are mounted in the frame and which are driven via electromotors located in said frame.

23. The device according to claim 10 defining a central channel and including guiding and transport elements which project into said channel, said transport elements being mounted on said frame and distributed about the channel cross-sectional periphery.

24. The device according to claim 23, including a further drive means for said transport elements to drive them in a direction of movement which extends in the direction of the longitudinal axis of said device.

25. The device according to claim 16, wherein the transport elements are mounted on the frame so that they can be adjusted and fixed in place in a radially inwardly manner.

26. The device according to claim 16, including additional clamping members disposed on the frame which are distributed about the channel cross-sectional periphery and which can be adjusted and fixed in place radially in a direction toward and away from said longitudinal axis.

27. The device according to claim 26, wherein the clamping members are piston plungers.

28. The device according to claim 1, including a support device fixed to the frame for supporting goods to be transported.

29. The device according to claim 1, including a gripping device fixed to the frame for picking up and setting down goods.

30. The device according to claim 1, including a fluid hose attached at one end to said frame.

31. The device according to claim 1, wherein the drive means of the individual propulsive elements can be regulated independently of one another.

32. The device according to claim 1, wherein the frame is designed substantially as a circular-cylindrical tube.

* * * * *